(No Model.) 2 Sheets—Sheet 2.
J. W. NIST.
DEVICE FOR SETTING THE TOOL CARRIERS OF PLANERS.
No. 410,290. Patented Sept. 3, 1889.
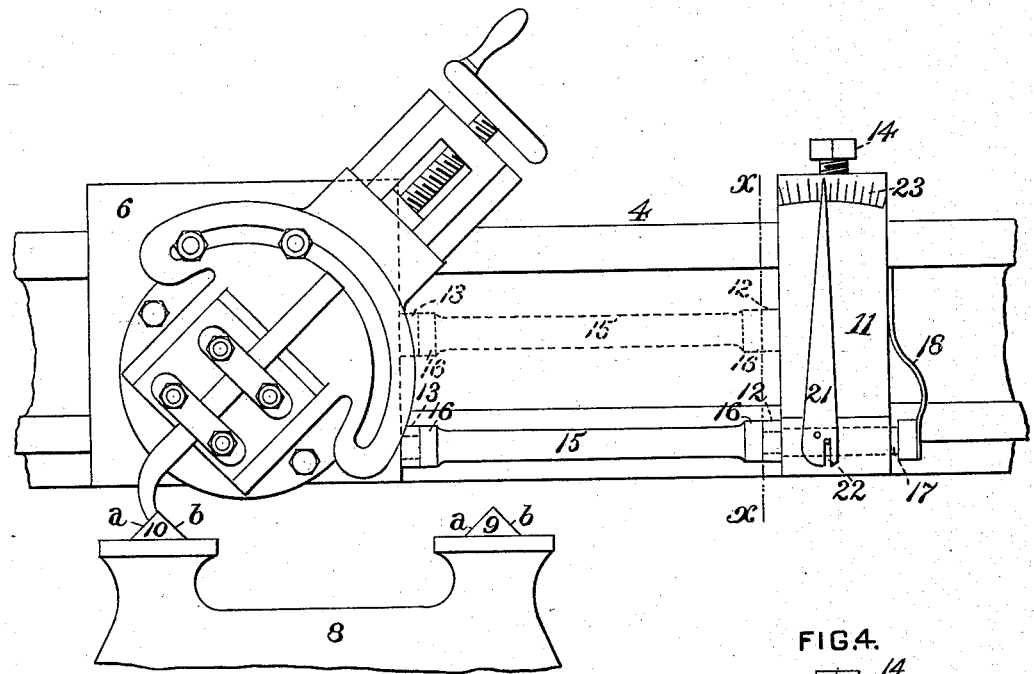
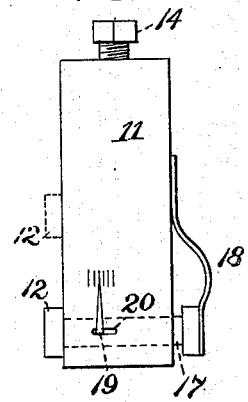
WITNESSES:
Darwin S. Wolcott
F. E. Gaither
INVENTOR,
Joseph W. Nist
by George H. Christy
Att'y.

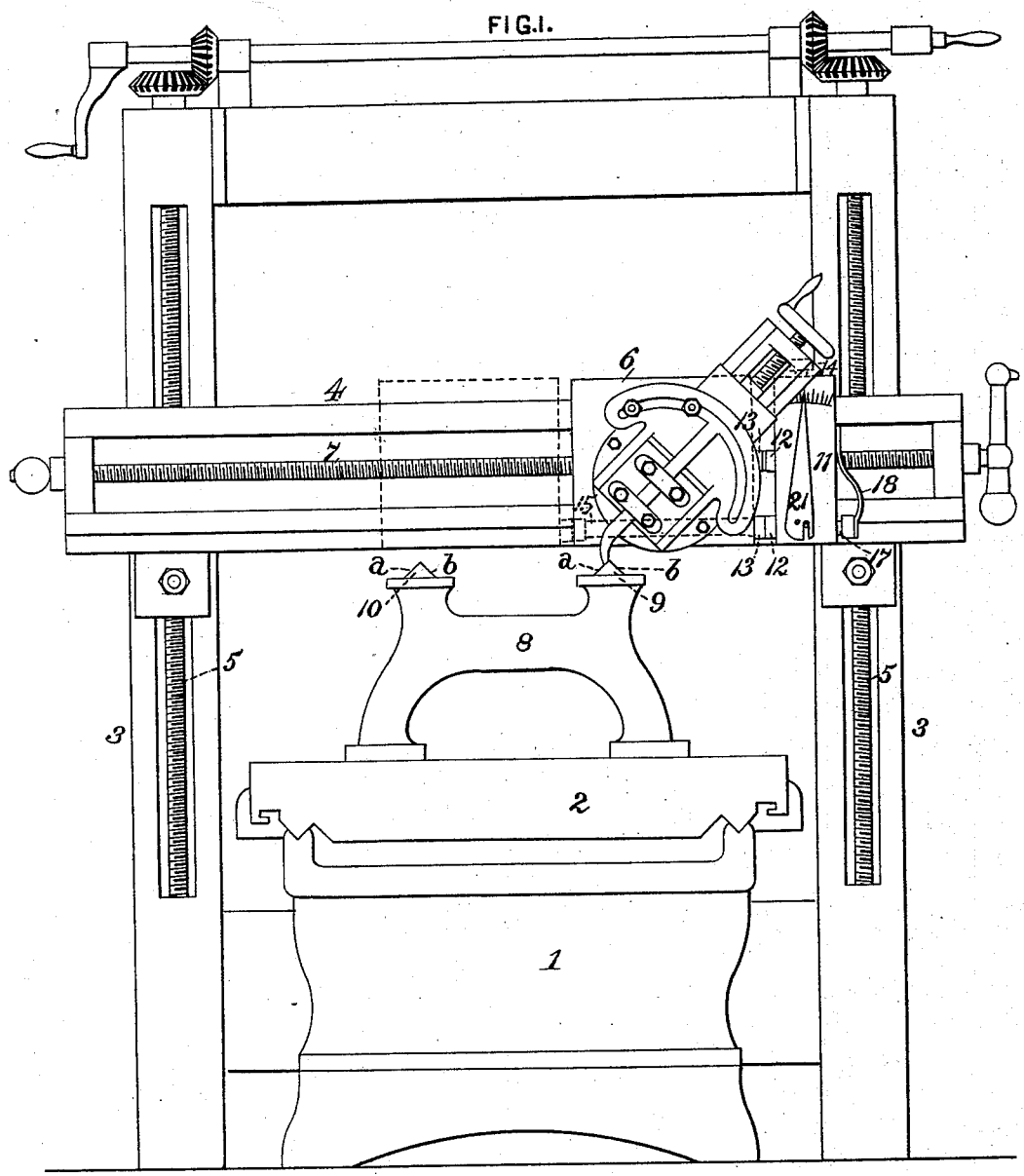

UNITED STATES PATENT OFFICE.

JOSEPH W. NIST, OF ALLEGHENY, PENNSYLVANIA.

DEVICE FOR SETTING THE TOOL-CARRIERS OF PLANERS.

SPECIFICATION forming part of Letters Patent No. 410,290, dated September 3, 1889.

Application filed June 24, 1889. Serial No. 315,332. (No model.)

*To all whom it may concern:*

Be it known that I, JOSEPH W. NIST, a citizen of the United States, residing at Allegheny, in the county of Allegheny and State of Pennsylvania, have invented or discovered certain new and useful Improvements in Attachments for Planers, of which improvements the following is a specification.

The invention described herein relates to certain improvements in metal planers, and has for its object an attachment to the planer, whereby the tool-carrier, having been set for cutting one of a series of two or more parts on a piece of work requiring to be parallel with each other, can be quickly and accurately adjusted for cutting the remainder of the series.

In general terms, the invention consists in the construction and combination of mechanical devices or elements, all as more fully hereinafter described and claimed.

In the accompanying drawings, forming a part of this specification, Figure 1 is a view in end elevation of a planer having my invention applied thereto. Fig. 2 is a detail view of the cross-head, the tool-carrier having been adjusted. Fig. 3 is a sectional view on the line $x$ $x$, Fig. 2, and Figs. 4 and 5 are detail views of modifications of my invention.

For the purpose of illustrating and describing my invention I have shown it applied to a planer of the usual construction, consisting of a foundation or base 1, a traversing-bed 2, the uprights 3, and the cross-head 4, vertically adjustable on the uprights by means of the screws 5. On the cross-head is mounted the tool-carrier 6, adjustable along the cross-head by means of the screw 7. On the movable bed 2 is secured the bed 8 of a planer or lathe whose guides 9 and 10 are to be planed.
In this operation the tool-carrier 6 is moved over to one end of the cross-head, as shown in Fig. 1, the tool adjusted for cutting the face $a$ of the guide 9, and said face cut in the usual manner. After the tool-carrier has been adjusted, as stated, for cutting the face $a$, a block 11, constructed to slide on the cross-head 4, is slid up toward the tool-carrier until a socket 12 on the edge of the block abuts against a corresponding socket 13 on the block of the tool-carrier 6, and is fastened in its adjusted position by a set-screw 14. After the block 11 has been adjusted and the face $a$ of the guide 9 cut, as above stated, the tool-carrier 6 is moved along the cross-head until the stems on the ends of the gage-bar 15 can be placed in the sockets 12 and 13, which are U-shaped, as shown in Fig. 3, for convenience in inserting the bar 15 in place. The tool-carrier is now moved toward the block 11 until the shoulders 16 on the bar 15 bear against the ends of the sockets 12 and 13, as shown in dotted lines in Fig. 2. The bar 15 is made of a length between the faces of the shoulders 16 equal to the distance between the faces $a$ of the guides 9 and 10, and hence the block 6 having been adjusted and secured to the cross-head, with its socket 12 in contact with the socket 13 on the tool-carrier, the latter will, when adjusted so that its socket 13 bears against the shoulder at one end of the bar 15, while the shoulder at the opposite end bears against the socket 12 of the block 11, be in proper position for cutting of the face $a$ of the guide 10.

In cutting the faces $b$ of the guides 9 and 10 the above-described operation is repeated—*i. e.*, the tool-carrier is first adjusted, then the block 11 is fastened in position. After the face $b$ of guide 9 is cut the tool-carrier is moved over, the bar 15 placed in position, and the carrier moved back until the shoulders of the bar bear against the sockets, as above described.

Unless considerable care is exercised in moving the tool-carrier toward the reference-block 11 when the bar 15 is placed in position, the bar is liable to be sprung or slightly bent, and hence the tool-carrier will not occupy the proper position for cutting the faces of the guide 10. In order to obviate this difficulty, I prefer to form the socket 12 of the block 11 on the end of bolt 17, passing through the block 11, the socket end of the bolt being held normally a short distance from the block by a spring 18, bearing against the opposite end of the block, as shown in Figs. 1 and 2. A pin 19, secured to said bolt 17, passes up through a slot 20 in the block 11, and along the edge of the slot are cut a series of marks, the left-hand mark being zero, or the position of the bolt and pin when the socket end of the bolt is held away from the block by the spring.

In using the block 11 with the spring-bolt the block 11, when first adjusted, is moved toward the tool-carrier until the pin 19 comes opposite a certain predetermined mark of the scale, and when adjusting the tool-carrier for operation on the guide 10, the bar 15 having been placed in position, the tool-carrier is moved toward the block 11 until the bolt and pin are moved in sufficiently far to bring the pin into register with the predetermined mark.

In order to provide a more delicate indicator than is afforded by the pin 19 alone, an index-finger 21 is pivoted to the block 11, adjacent to the pin 19, which, engaging a slot 22 in the finger, shifts the latter as the bolt is moved. A scale 23 is formed along the arc of the circle traversed by the point of the finger.

If desired, the gage-bar 15 may be made in two parts, one fitting inside the other, as shown in Fig. 5. In this construction the shoulders 16 are normally held by the interposed spring 24 a little greater distance apart than the distance between the guides 9 and 10, and are pushed toward each other by the movement of the tool-carrier until the scale 25 indicates the proper relation of the shoulders.

When using the telescopic bar, the spring-bolt 17 may be omitted, the socket 12 being formed on the edge of the block 11.

If desired, an ordinary measuring-scale may be employed in lieu of the gage-bar for determining the second position of the tool-carrier, the inner edge of the reference-block 11 or some other suitable point thereon being the reference or starting point to determine such position.

When using the ordinary measuring-scale, the sockets on the block 11 may be omitted and a transverse opening may be formed therethrough, so that the scale may be passed through such opening and its end supported by the socket on the tool-carrier.

The main characteristics of the invention herein are an adjustable reference-block mounted on the cross-head with the tool-carrier, and a measuring device or implement whereby the position of the tool-carrier with reference to the block 11 may be determined, and under the term "gage-bar" I include any such measuring device or implement for determining the position of the tool-carrier.

I claim herein as my invention—

1. The combination of a planer cross-head, a tool-carrier mounted thereon, a reference-block adjustably mounted on the cross-head, and a gage-bar, substantially as set forth.

2. The combination of a planer cross-head, a tool-carrier mounted thereon, a reference-block adjustably mounted on the cross-head, a gage-bar, and supports on the tool-carrier and block for supporting the gage-bar, substantially as set forth.

3. The combination of a planer cross-head, a tool-carrier mounted thereon, a reference-block adjustably mounted on the cross-head, a gage-bar, and supports or sockets on the tool-carrier and block for supporting the gage-bar, the support or socket on the reference-block being yieldingly mounted therein, substantially as set forth.

4. The combination of a planer cross-head, a tool-carrier mounted thereon, a reference-block adjustably mounted on the cross-head, a gage-bar, supports or sockets on the tool-carrier and reference-block for supporting the gage-bar, the support or socket on the reference-block being yieldingly mounted therein, and an index-finger operated by the yielding support or socket, substantially as set forth.

In testimony whereof I have hereunto set my hand.

JOSEPH W. NIST.

Witnesses:
DARWIN S. WOLCOTT,
W. B. CORWIN.